US011088569B2

(12) United States Patent
Tsujii et al.

(10) Patent No.: US 11,088,569 B2
(45) Date of Patent: Aug. 10, 2021

(54) POWER FLOW MONITORING DEVICE FOR POWER SYSTEM, POWER SYSTEM STABILIZATION DEVICE, AND POWER FLOW MONITORING METHOD FOR POWER SYSTEM

(71) Applicant: Hitachi, Ltd., Tokyo (JP)

(72) Inventors: Yuki Tsujii, Tokyo (JP); Kenedward Kawakita, Tokyo (JP); Masatoshi Kumagai, Tokyo (JP); Masahiro Watanabe, Tokyo (JP); Akira Kikuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 36 days.

(21) Appl. No.: 16/339,078

(22) PCT Filed: Sep. 13, 2017

(86) PCT No.: PCT/JP2017/032974
§ 371 (c)(1),
(2) Date: Apr. 3, 2019

(87) PCT Pub. No.: WO2018/070170
PCT Pub. Date: Apr. 19, 2018

(65) Prior Publication Data
US 2019/0237997 A1 Aug. 1, 2019

(30) Foreign Application Priority Data
Oct. 13, 2016 (JP) .............................. JP2016-201441

(51) Int. Cl.
*H02J 13/00* (2006.01)
*G05B 19/042* (2006.01)
(Continued)

(52) U.S. Cl.
CPC ........ *H02J 13/0006* (2013.01); *G05B 19/042* (2013.01); *G05B 23/0235* (2013.01);
(Continued)

(58) Field of Classification Search
CPC .......... H02J 13/0006; H02J 13/00; H02J 3/00; H02J 3/24; H02J 13/00002; H02J 3/06;
(Continued)

(56) References Cited

U.S. PATENT DOCUMENTS 5,359,291 A * 10/1994 Dommerich, III ..........................
G01R 31/2812
324/522
6,014,617 A * 1/2000 Kawahara ............... G10L 25/90
704/205
(Continued)

FOREIGN PATENT DOCUMENTS

CN 105406476 A * 3/2016
FI 109945 B * 10/2002
(Continued)

OTHER PUBLICATIONS

Ota et al, "Development of Transient Stability Control System (TSC System) Based on On-line Stability Calculation", Aug. 1996, IEEE, pp. 1463-1472 downloaded from the internet https://ieeexplore.ieee.org/document/535687?reload=true (Year: 1996).*
(Continued)

Primary Examiner — Rocio Del Mar Perez-Velez
Assistant Examiner — Olvin Lopez Alvarez
(74) Attorney, Agent, or Firm — Crowell & Moring LLP

(57) ABSTRACT

The purpose of the present invention is to provide a power flow monitoring device for a power system, a power system stabilization device, and a power flow monitoring method for a power system, which are highly reliable and accurate.
(Continued)

The present invention is characterized by being provided with: a power system information database which stores measurement data obtained at a first node of the power system; a phase measurement value database which stores temporally synchronized phase measurement data obtained at a second node of the power system; a fault condition database which stores a power flow state under an assumed fault condition of the power system; a state estimation unit which estimates a state quantity of the power system using information in the power system information database as an input; a stability error detection index calculation unit which calculates a stability error detection index using, as an input, a state quantity estimation value which is an output of the state estimation unit, information of the state quantity from the phase measurement value database, and information in the fault condition database; and an error detection alert generation unit which compares the stability error detection index with a threshold value thereof and generates an alert when the stability error detection index exceeds the threshold value, wherein the magnitude of deviation of the state quantity estimation value with respect to the information of the state quantity from the phase measurement data is evaluated according to the assumed fault condition before the alert is generated.

10 Claims, 10 Drawing Sheets

(51) Int. Cl.
*H02J 3/00* (2006.01)
*H02J 3/24* (2006.01)
*G05B 23/02* (2006.01)

(52) U.S. Cl.
CPC ...... *H02J 3/00* (2013.01); *H02J 3/24* (2013.01); *H02J 13/00* (2013.01); *G05B 2219/2639* (2013.01)

(58) Field of Classification Search
CPC .............. G05B 23/0235; G05B 19/042; G05B 2219/2639
See application file for complete search history.

(56) References Cited

U.S. PATENT DOCUMENTS

| | | | | |
|---|---|---|---|---|
| 8,190,379 | B2* | 5/2012 | Rehtanz | H02J 3/24 702/57 |
| 9,876,352 | B2* | 1/2018 | Biswas | H02J 13/00034 |
| 9,939,485 | B1* | 4/2018 | Johnson | G08B 21/182 |
| 2002/0044062 | A1* | 4/2002 | Yoshioka | G08B 25/016 340/636.15 |
| 2008/0106425 | A1* | 5/2008 | Deaver | G06Q 50/06 340/646 |
| 2008/0262758 | A1 | 10/2008 | Rehtanz et al. | |
| 2011/0082653 | A1* | 4/2011 | Balcerek | G01R 31/088 702/59 |
| 2012/0046889 | A1 | 2/2012 | Sun et al. | |
| 2014/0052304 | A1* | 2/2014 | Vuppala | H02J 4/00 700/295 |
| 2014/0189967 | A1* | 7/2014 | Schneider | A47L 11/4069 15/52.1 |
| 2015/0214741 | A1* | 7/2015 | Kuroda | H02J 13/00034 700/298 |
| 2016/0103442 | A1* | 4/2016 | Lyu | G06F 1/3206 700/291 |
| 2016/0179120 | A1* | 6/2016 | Boardman | G05F 1/66 700/295 |
| 2016/0276832 | A1* | 9/2016 | Kawai | H02J 3/14 |
| 2017/0045558 | A1* | 2/2017 | Kuroda | G01R 19/0084 |
| 2017/0364043 | A1* | 12/2017 | Ganti | G05B 13/048 |
| 2020/0251902 | A1* | 8/2020 | Tsujii | G05B 15/02 |

FOREIGN PATENT DOCUMENTS

| | | | |
|---|---|---|---|
| WO | WO 2007/053965 A1 | 5/2007 | |
| WO | WO 2016/104018 A1 | 6/2016 | |

OTHER PUBLICATIONS

Asprou et al "A Two-Stage State Estimator for Dynamic Monitoring of Power Systems", Sep. 2017 pp. 1767-1776 downloaded from the internet https://ieeexplore.ieee.org/stamp/stamp.jsp?tp=&arnumber=6996005 (Year: 2017).*
Das et al, "Real-time Hybrid State Estimation Incorporating SCADA and PMU Measurements", 2012, pp. 1-8 downloaded from the internet https://ieeexplore.ieee.org/document/6465749 (Year: 2012).*
Tsujii et al, "State estimation Error Detection System for Online Dynamic Security Assessment", Apr. 2017, pp. 5, https://ieeexplore.ieee.org/document/8086079 (Year: 2017).*
Bi et al, "A novel hybrid state estimator for including synchronized phasor measurements", 2008, pp. 1343-1352 downloaded from the internet https://www.sciencedirect.com/science/article/pii/S0378779607002374 (Year: 2008).*
Soni et al, "Linear State Estimation Model Using Phasor Measurement Unit (PMU) Technology", 2012, pp. 6, downloaded from the internet "https://ieeexplore.ieee.org/document/6421206" (Year: 2012).*
NYSERDA, "Real time Applications of Phasor Measurement units (PMU) for visualization, Reactive Power Monitoring and Voltage Stability Protection, 2010", 2010, pp. 125, downloaded from internet file:///C:/Users/olopez/Downloads/real-time-applications-PMU%20(2).pdf (Year: 2010).*
International Search Report (PCT/ISA/210) issued in PCT Application No. PCT/JP2017/032974 dated Oct. 10, 2017 with English translation (three (3) pages).
Japanese-language Written Opinion (PCT/ISA/237) issued in PCT Application No. PCT/JP2017/032974 dated Oct. 10, 2017 (four (4) pages).

* cited by examiner

[FIG. 1]
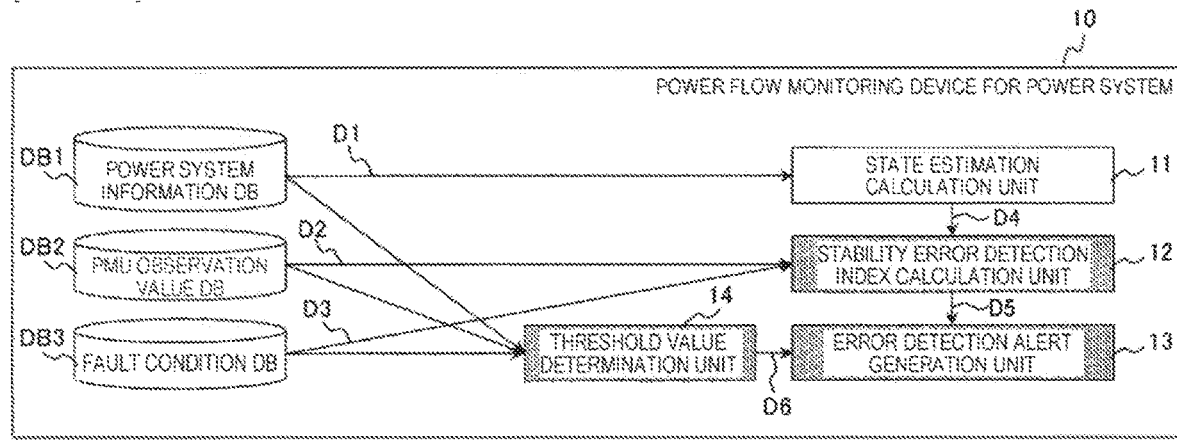
[FIG. 2]
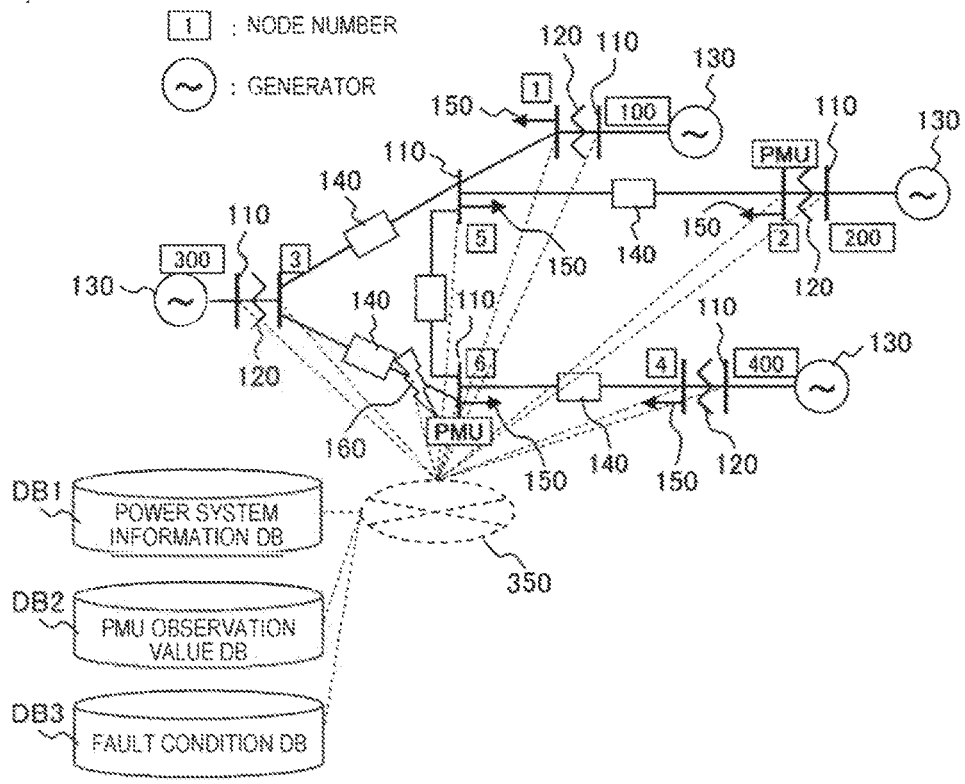

[FIG. 3]
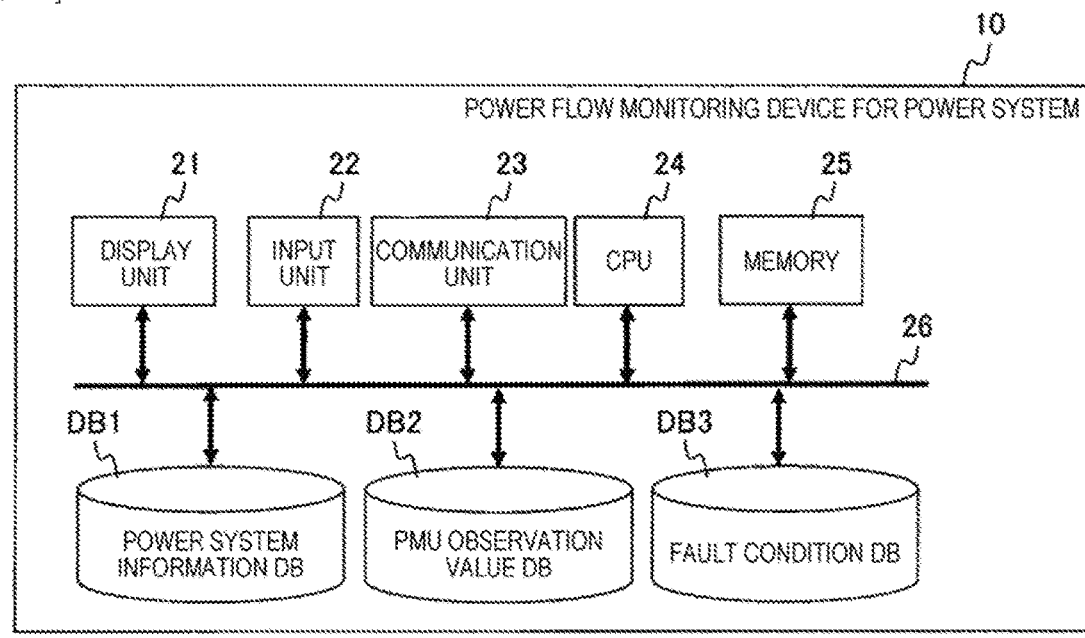
[FIG. 4]
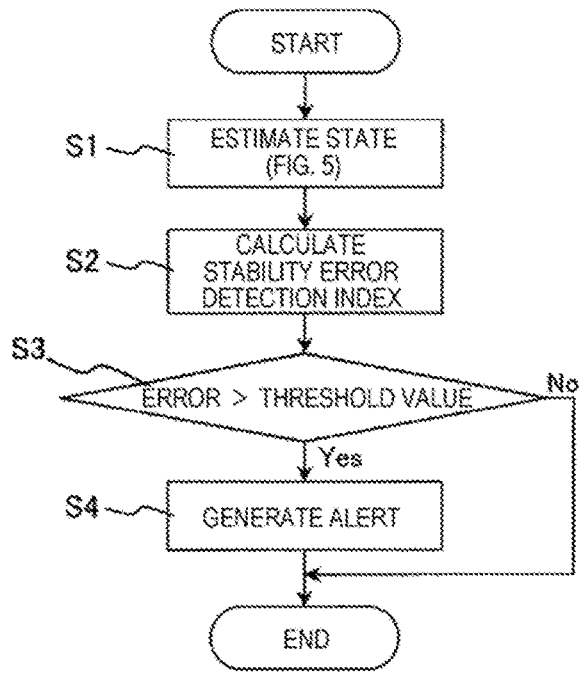

[FIG. 5]
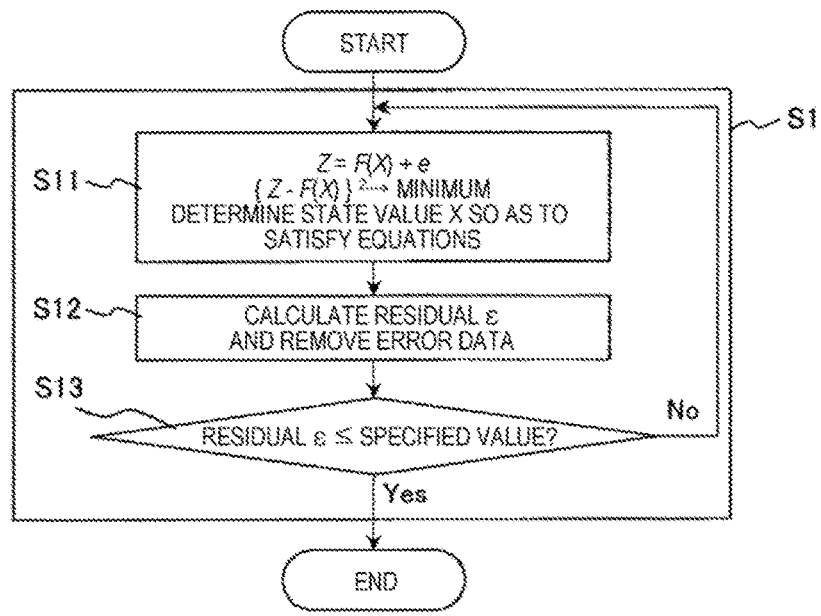
[FIG. 6]
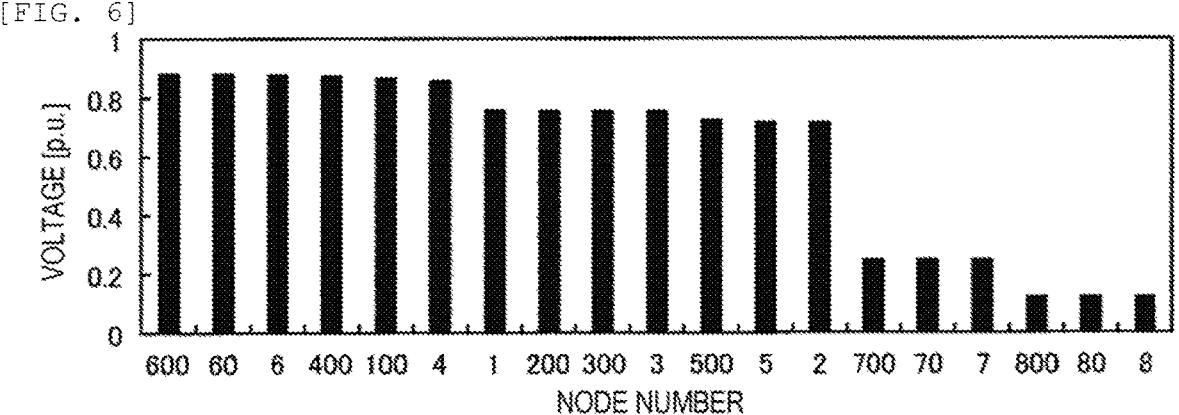

[FIG. 7]
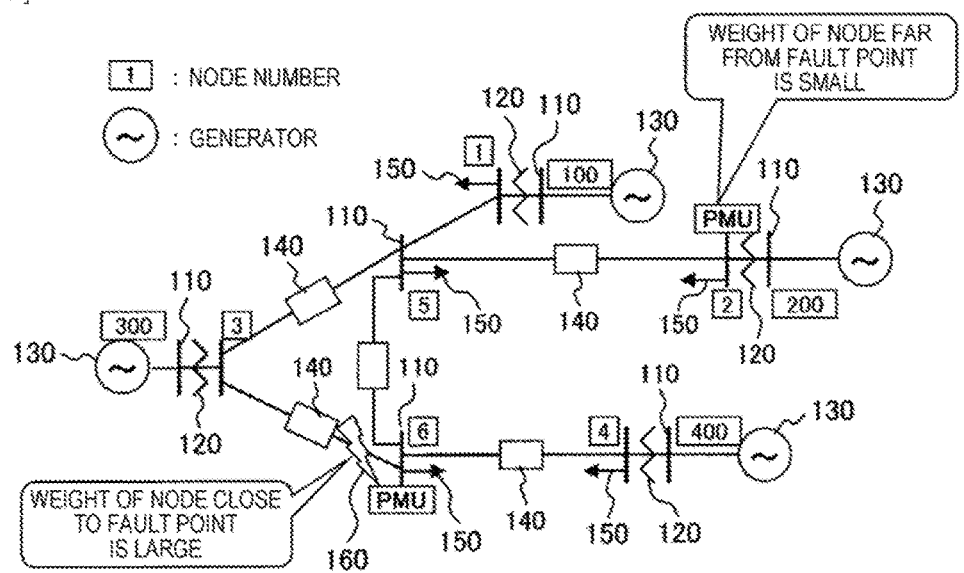
[FIG. 8]
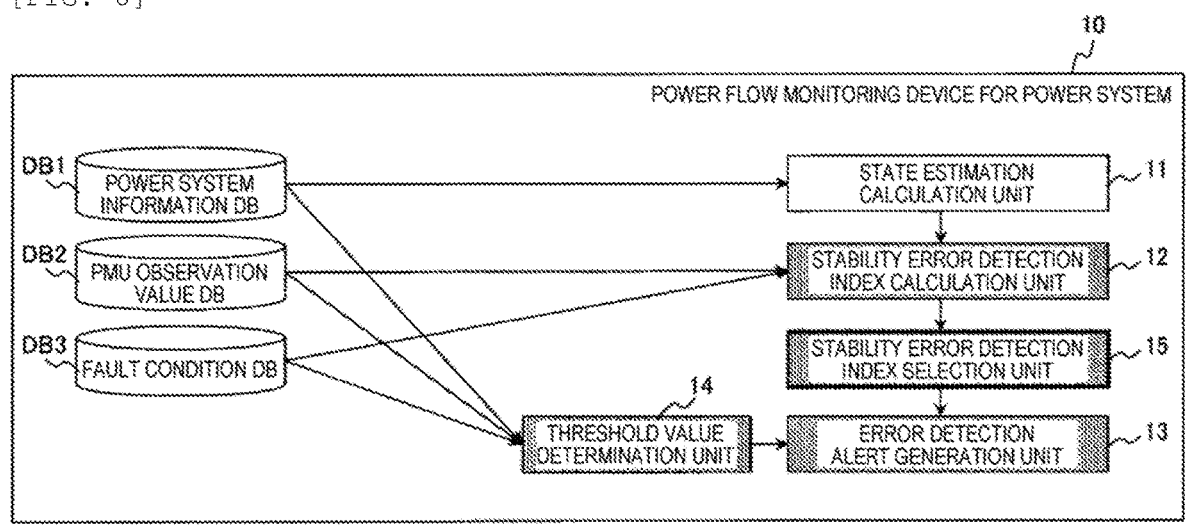

[FIG. 9]
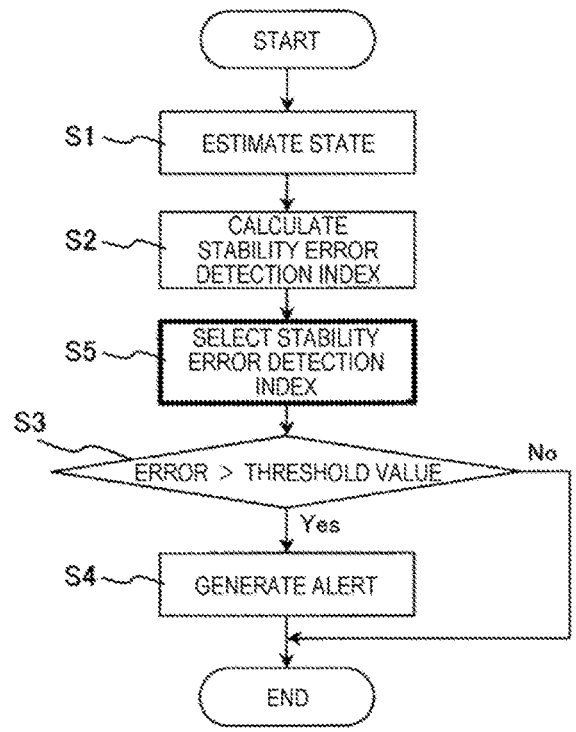
[FIG. 10]
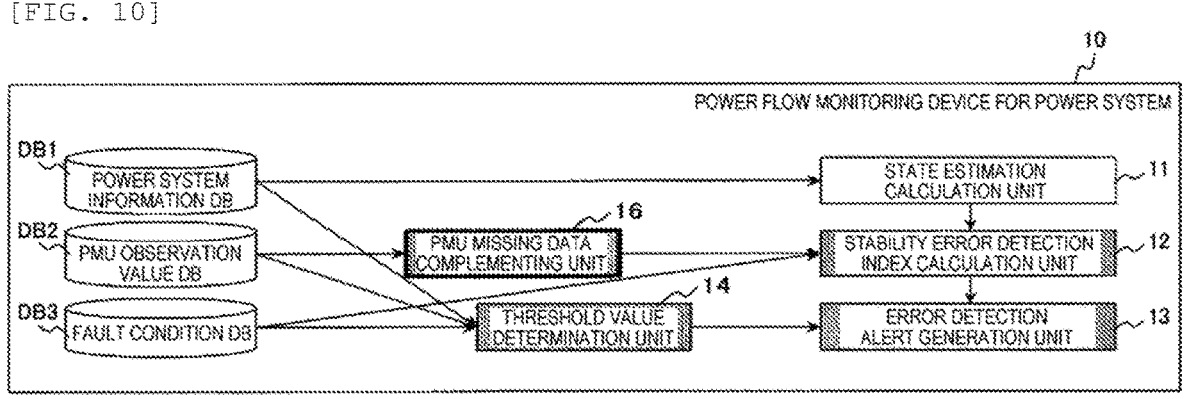

[FIG. 11]
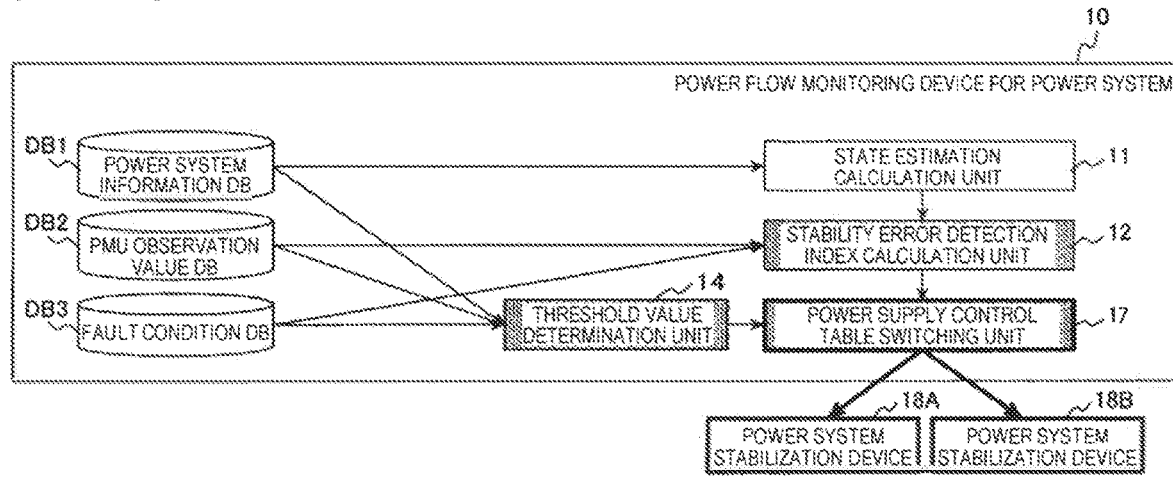
[FIG. 12]
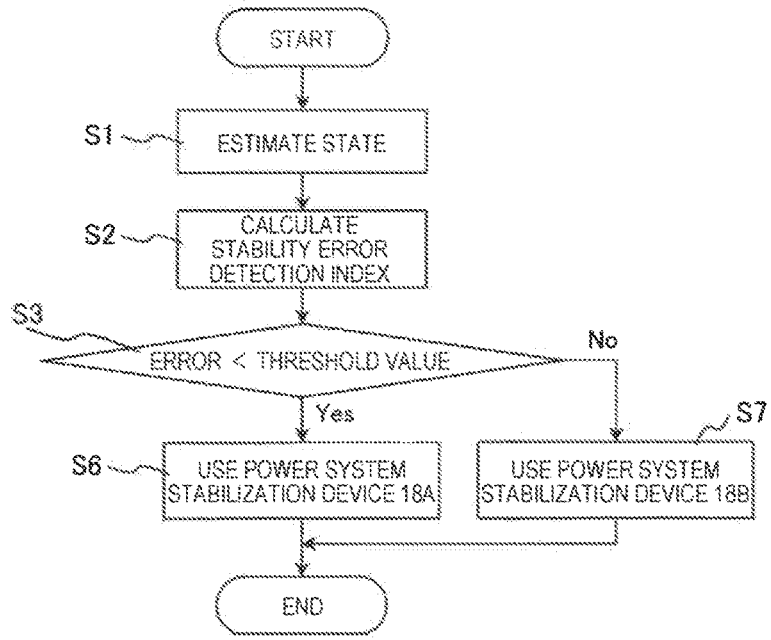

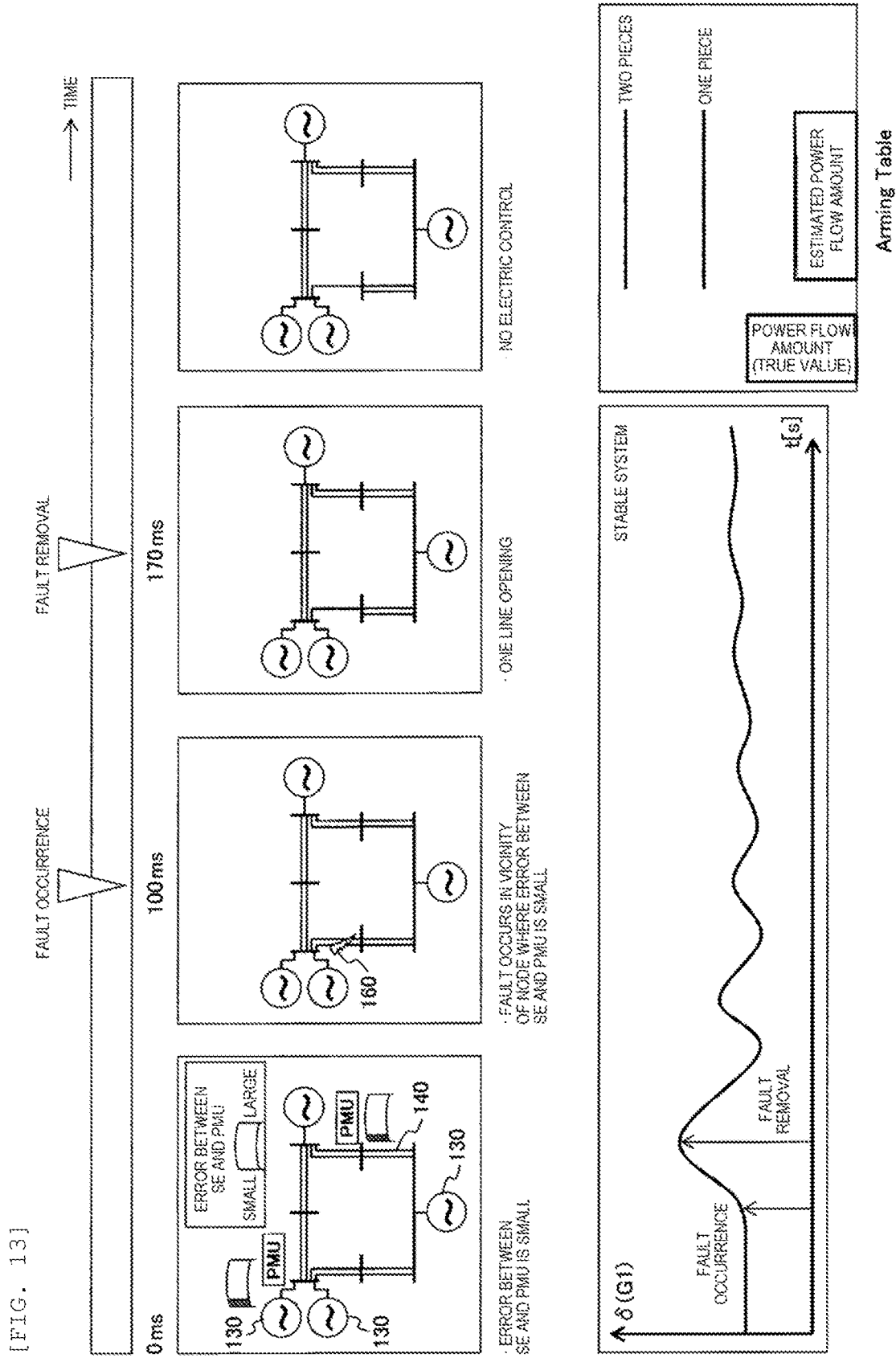
[FIG. 13]

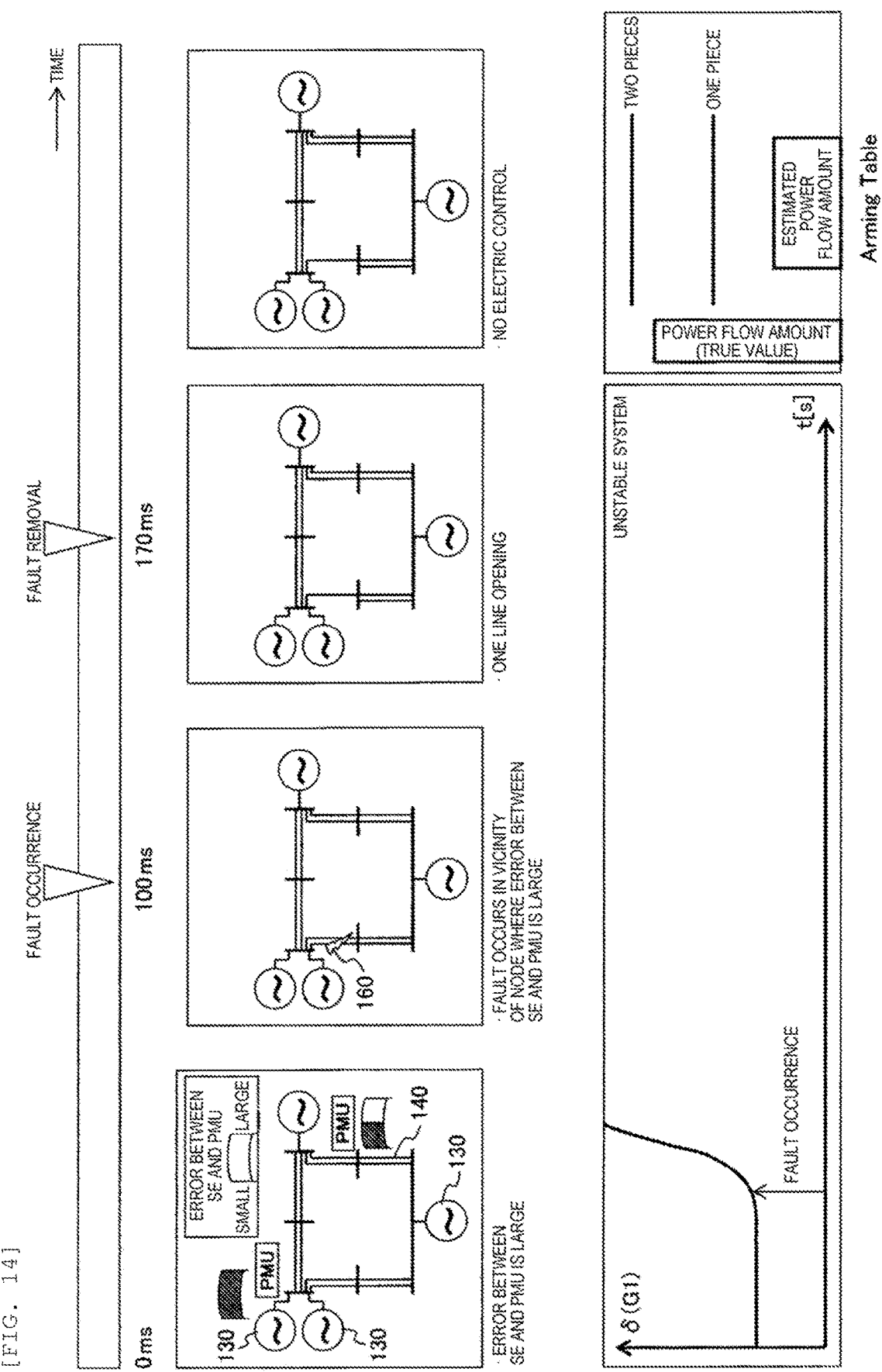
[FIG. 14]

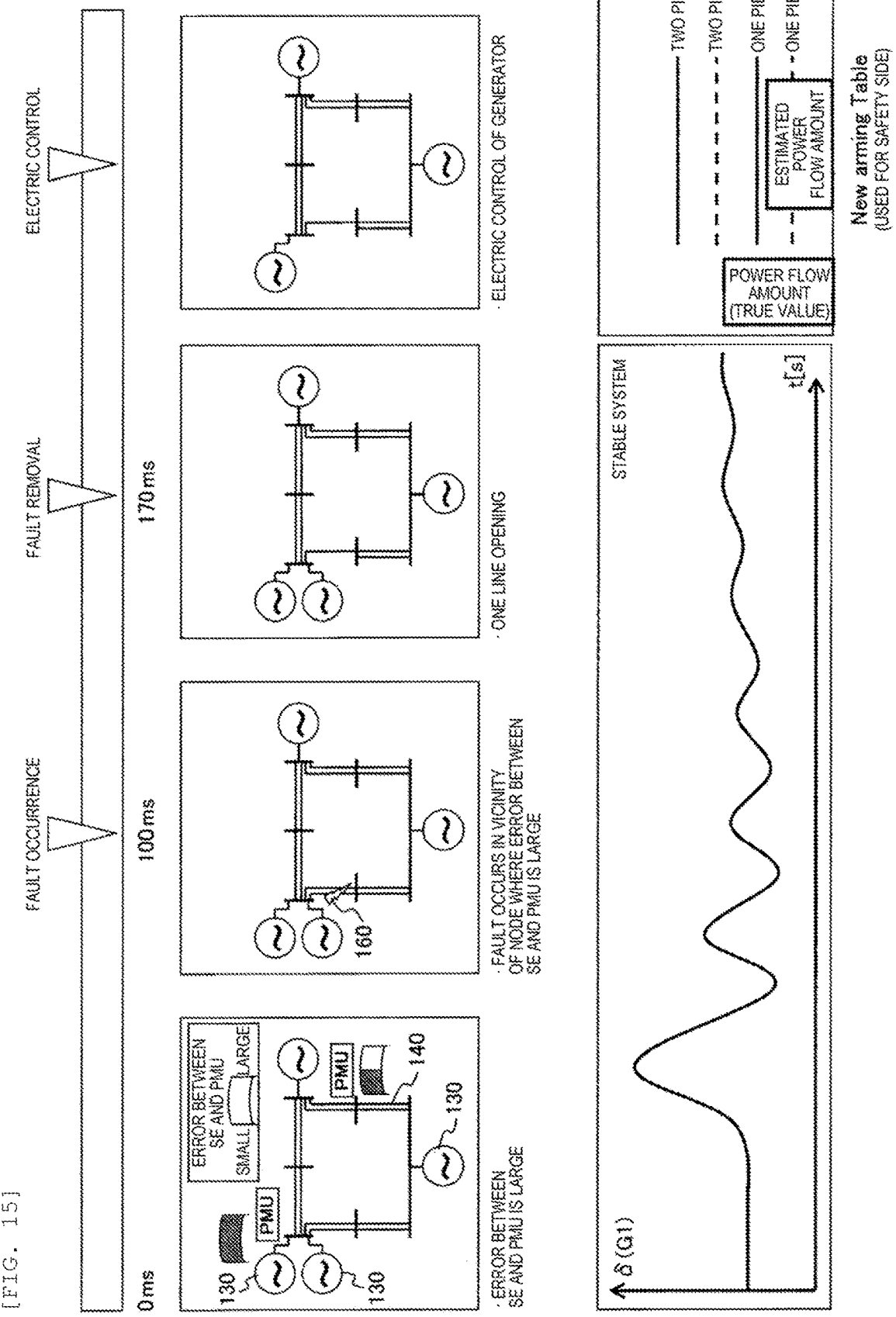
[FIG. 15]

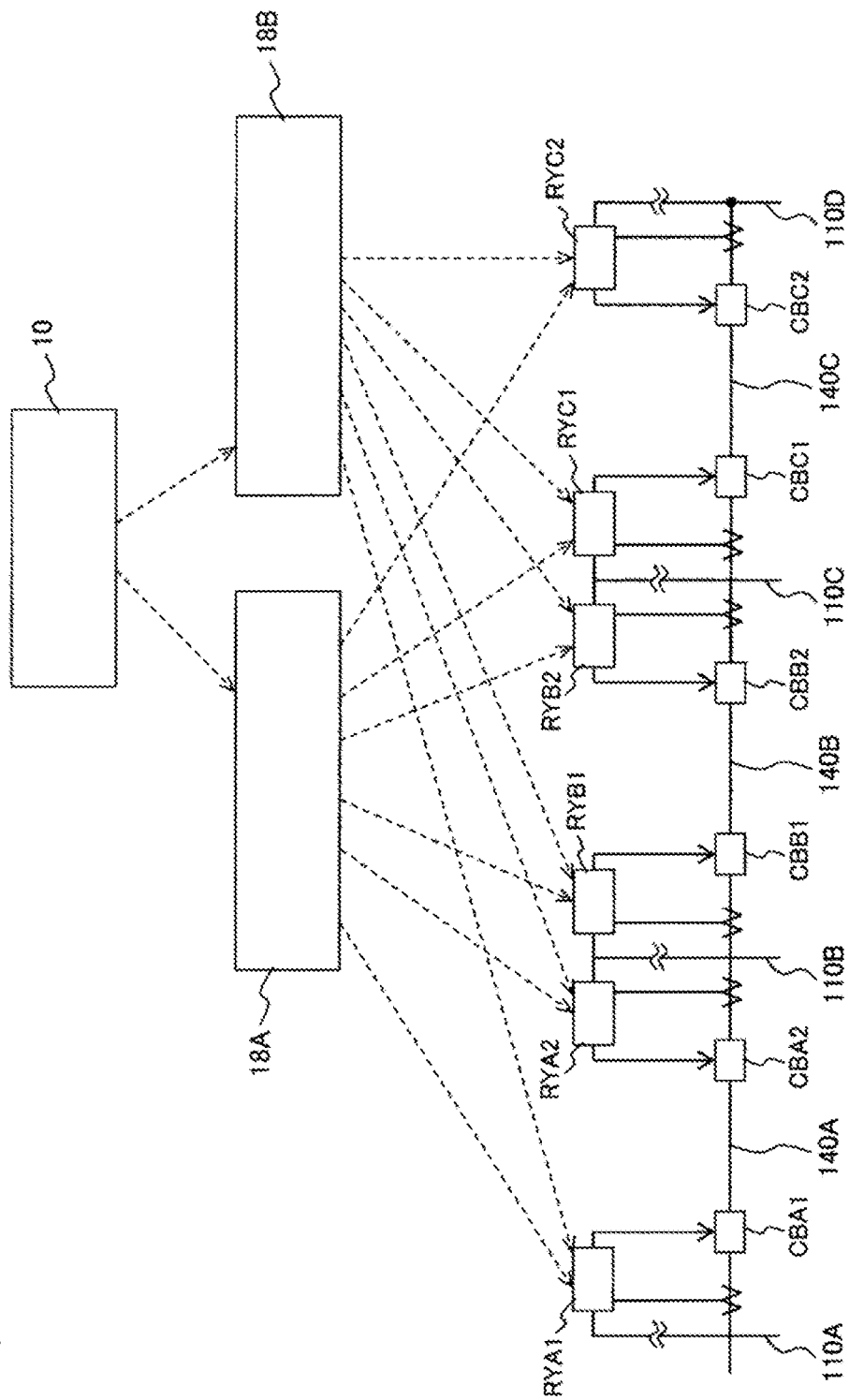
[FIG. 16]

POWER FLOW MONITORING DEVICE FOR POWER SYSTEM, POWER SYSTEM STABILIZATION DEVICE, AND POWER FLOW MONITORING METHOD FOR POWER SYSTEM

TECHNICAL FIELD

The present invention relates to a power flow monitoring device for a power system, a power system stabilization device, and a power flow monitoring method for a power system for detecting a state estimation error affecting the stability of a power system.

BACKGROUND ART

Grasping a state of a power flow (effective power P, reactive power Q, voltage V, voltage phase δ) of a power system is not only effective for monitoring and controlling the power system, but also useful for constructing an analysis model such as power flow calculation, and the like. It is possible to predict the power system state which may occur in the future and to take stabilization measures in preparation for a fault of the power system in advance by reproducing a state close to the current power system as the analysis model. Further, generally, the state of the power system is grasped by state estimation calculation using a measurement value of an electric quantity (effective power, reactive power, voltage magnitude, voltage phase, current, and the like) measured by a measurement sensor installed in the power system.

In order to grasp the state of the power system, it is important to prepare a sufficient number of measurement values and to put the state of the power system in an observable state in order to solve a power equation of the power system, however, there exists a problem that the state estimation calculation may not converge, depending on a configuration of the power system and a power flow condition thereof (when there exists a section where a resistance component of a line is large; when there exists a section where s reactive power flow is large; and when, for example, voltage values of adjacent measurement values are significantly different from each other). Further, even when the calculation converges, there exists a problem that a large deviation (residual) is generated between a measurement value and an estimation value such that reliability of an obtained estimation result (power flow state) deteriorates. Particularly, it is conceivable that the above-mentioned problem may occur in an area where a monitoring function of the power system and accuracy thereof are insufficient.

When the reliability of the estimation result deteriorates, for example, reliability of a power system stabilization device also deteriorates. The power system stabilization device is a device that separates (electric control) an accelerated generator from the power system in order to prevent a phenomenon that synchronization between generators cannot be maintained from spreading when an internal phase difference angle of the accelerated generator with respect to a reference generator is larger than that of another generator due to a power system fault.

In this case, when a wrong estimation result is inputted to the power system stabilization device and an electric control generator is determined, it is impossible to appropriately perform the electric control to prevent power failure. Since it is not known whether or not a state estimation error affects power system stability, there exists a possibility of the power failure due to failure of appropriate measures such as power supply control, and the like.

With respect to the point described above, it is currently expected that a power flow monitoring device for the power system that verifies the accuracy of the state estimation will be spread by adopting a phase measurement device PMU (Phasor Measurement Unit).

The state of the art discloses the technical field using the phase measurement device PMU. The state of the art, it is described that validity of the state estimation is verified by comparing a state estimation result with data of the phase measurement device PMU.

SUMMARY OF INVENTION

Technical Problem

However, in the power flow monitoring device for the power system disclosed in the state of the art, it is not known whether or not the state estimation error affects the power system stability. Therefore, there exists a possibility that the appropriate measures such as the power supply control, and the like are not taken, thereby causing an increase in cost due to measures such as excessive power supply control, and the like, and power failure due to measures such as excessively small power supply control, and the like.

Accordingly, an object of the present invention is to provide a power flow monitoring device for a power system, a power system stabilization device, and a power flow monitoring method for a power system, which are highly reliable and accurate.

More specifically, for example, in a case where the calculation of the state estimation does not converge or in a case where the accuracy is low, the aforementioned case is detected as an abnormality and an alert is generated by detecting a state quantity error affecting the stability, and the appropriate measures such as the power supply control, and the like are taken when the alert is generated, whereby the object of the present invention is to provide the power flow monitoring device for the power system and the power flow monitoring method for the power system capable of preventing the increase in cost due to the measures such as the excessive power supply control, and the like, and the power failure due to the measures such as the excessively small power supply control, and the like.

Solution to Problem

In order to solve the above-mentioned problems, the present invention provides a power flow monitoring device for a power system, including: a power system information database which stores measurement data obtained at a first node of a power system; a phase measurement value database which stores temporally synchronized phase measurement data obtained at a second node of the power system; a fault condition database which stores a power flow state under an assumed fault condition of the power system; a state estimation unit which estimates a state quantity of the power system using information in the power system information database as an input; a stability error detection index calculation unit which calculates a stability error detection index using, as an input, a state quantity estimation value which is an output of the state estimation unit, information of the state quantity from the phase measurement value database, and information in the fault condition database; and an error detection alert generation unit which compares the stability error detection index with a threshold value thereof and generates an alert when the stability error detection index exceeds the threshold value, wherein the magnitude of deviation of the state quantity estimation value with respect to the information of the state quantity from the phase measurement data is evaluated according to the assumed fault condition before the alert is generated.

Further, the present invention provides a power system stabilization device which calculates power system stability under an assumed fault condition of a power system and gives an opening command to a predetermined circuit breaker of the power system when the assumed fault condition is generated, including: a power system stabilization device at normal time; a power system stabilization device which takes measures such as power supply control, and the like on the safety side; and a power supply control table switching unit which performs opening control of the circuit breaker of the power system by the power system stabilization device for taking measures such as the power supply control, and the like on the safety side when the error detection alert generation unit of the power flow monitoring device for the power system compares the stability error detection index with a threshold value thereof and the stability error detection index exceeds the threshold value thereof, and is switched so as to perform the opening control of the circuit breaker of the power system by the power system stabilization device at normal time when the stability error detection index does not exceed the threshold value, wherein appropriate electric control can be performed by switching the power supply control table with a detection index having an influence on the error of stability, thereby preventing power failure.

Further, the present invention provides a power flow monitoring device for a power system, including: a power system information database which stores measurement data obtained at a first point of a power system; a phase measurement value database which stores temporally synchronized phase measurement data obtained at a second point of the power system; a fault condition database which stores a voltage drop amount at a plurality of points in the power system at the time of an assumed fault condition of the power system; a state estimation unit which estimates a state quantity of the power system using the measurement data of the power system information database as an input; a stability error detection index calculation unit which calculates a stability error detection index using, as an input, a state quantity estimation value which is an output of the state estimation unit, information of the state quantity from the phase measurement value database, and the voltage drop amount at the plurality of points in the power system of the fault condition database; and an error detection alert generation unit which compares the stability error detection index with a threshold value thereof and generates an alert when the stability error detection index exceeds the threshold value.

Further, the present invention provides a power flow monitoring method for a power system, including: using measurement data obtained from a measurement instrument installed at a first node of the power system, temporally synchronized phase measurement data obtained from a PMU installed at a second node of the power system, and power flow state data for estimating a power flow state of the power system at the node when an assumed fault occurs in the power system; obtaining an estimation value with respect to a state quantity representing stability of the power system from the measurement data and setting a state quantity representing the stability of the power system in the phase measurement data obtained from the PMU as a true value; and obtaining a stability error detection index according to a difference between the true value and the estimation value and the power flow state data and generating an alert when the stability error detection index exceeds a threshold value thereof.

Advantageous Effects of Invention

According to the present invention, in a case where the calculation of the state estimation does not converge or in a case where the accuracy is low, the case is detected as an abnormality and an alert is generated by detecting a state quantity error affecting the stability. An increase in cost due to measures such as excessive power supply control, and the like, and power failure due to measures such as excessively small power supply control, and the like are prevented by taking appropriate measures such as power supply control and the like when the alert is generated.

BRIEF DESCRIPTION OF DRAWINGS

FIG. 1 is a diagram illustrating a software configuration example of a power flow monitoring device for a power system according to a first embodiment.

FIG. 2 is a diagram illustrating an example of a power system in which a plurality of measurement data are stored in a database via a communication network.

FIG. 3 is a diagram illustrating a hardware configuration example of the power flow monitoring device for the power system according to the first embodiment.

FIG. 4 is a flowchart illustrating an overall process example of the power flow monitoring device for the power system according to the first embodiment.

FIG. 5 is a flowchart illustrating an example of a state estimation process.

FIG. 6 is a diagram illustrating an example of a voltage change of each node at the time of an assumed fault.

FIG. 7 is a diagram illustrating a situation when the assumed fault occurs in the power system of FIG. 2.

FIG. 8 is a diagram illustrating a software configuration example of a power flow monitoring device for a power system according to a second embodiment.

FIG. 9 is a flowchart illustrating an overall process example of the power flow monitoring device for the power system according to the second embodiment.

FIG. 10 is a diagram illustrating a software configuration example of a power flow monitoring device for a power system according to a third embodiment.

FIG. 11 is a diagram illustrating a software configuration example of a power flow monitoring device for a power system according to a fourth embodiment.

FIG. 12 is a flowchart illustrating an overall process example of the power flow monitoring device for the power system according to the fourth embodiment.

FIG. 13 is a diagram illustrating a case in which state estimation is desirable when using a power system stabilization device 18A at normal time.

FIG. 14 is a diagram illustrating a case in which a state estimation error cannot be detected when using the power system stabilization device 18A at normal time.

FIG. 15 is a diagram illustrating a case in which a state estimation error is detected and falls on the safety side when using a power system stabilization device 18B that takes measures such as power supply control on the safety side.

FIG. 16 is a diagram illustrating a concept of power system control, protection, and monitoring which is a background of the fourth embodiment.

DESCRIPTION OF EMBODIMENTS

Hereinafter, embodiments desirable for performing the present invention will be described. Further, it should be noted that the following embodiments are only examples of the implementation and the invention itself is not intended to be limited to the specific contents below.

First Embodiment

A first embodiment of the present invention will be hereinafter described.

FIG. 1 is a diagram illustrating a software configuration example of a power flow monitoring device for a power system 10 to which an embodiment of the present invention is applied. The power flow monitoring device for the power system 10 is provided with a power system information database DB1, a PMU observation value database DB2, a fault condition database DB3, a state estimation calculation unit 11, a stability error detection index calculation unit 12, an error detection alert generation unit 13, and a threshold value determination unit 14.

FIG. 2 illustrates an example of a power system in which a plurality of measurement data are stored in a database via a communication network. The power system in FIG. 2 is a system in which a plurality of generators 130 and loads 150 are connected to each other via a bus (node) 110, a transformer 120, a power transmission line 140, and the like. Further, in FIG. 2, a reference sign 160 illustrates an assumed fault point in the power system.

Various kinds of measurement instruments for the purpose of protecting, controlling, and monitoring the power system are appropriately installed at the node 110, and a signal detected by the measurement instrument is appropriately stored and saved in the power system information database DB1, the PMU observation value database DB2, and the fault condition database DB3 illustrated in FIG. 1 via a communication network 350. Further, in FIG. 2, node numbers illustrated in the diagram are appropriately given to the nodes 110. In the illustrated example, a phase measurement device PMU (Phasor Measurement Unit) is installed on nodes having node numbers 2 and 6, and a signal measured by the phase measurement device PMU is stored and saved in the PMU observation value database DB2. At the nodes having other node numbers, for example, a current transformer CT, a voltage transformer PT, and the like are installed as existing measurement instruments, and signals measured by the existing measurement instruments are stored and saved in the power system information database DB1. Further, the fault condition database DB3 stores a voltage change, and the like of the node according to a condition of an assumed fault (reference sign 160 in FIG. 2) of each place and aspect already calculated by preliminary calculation, and the like.

Further, in the power system illustrated in FIG. 2, there exist a node for installing the phase measurement device PMU and a node for installing only the existing measurement instrument, and a situation is that the number of nodes capable of installing an expensive phase measurement device PMU is limited. Therefore, the state estimation of the power system at the node where the phase measurement device PMU is installed can be accurately performed, whereas it is inevitable that the state estimation of the power system at the node where only other existing measurement instruments are installed deteriorates in accuracy. Accordingly, in the present invention, it is intended to improve accuracy of the whole power system by reflecting a measurement result of the node where the phase measurement device PMU is installed on a measurement result of the node where the phase measurement device PMU is not installed.

Referring back to FIG. 1, in the power flow monitoring device for the power system 10, for example, the measurement data at a plurality of measurement points installed at each node of the power system of FIG. 2 are stored in the power system information database DB1 via the communication network 350, and the state estimation calculation unit 11 estimates the state of the power system based upon stored measurement data D1.

In the stability error detection index calculation unit 12, estimation result data D4 of the state estimation circulation unit 11 and, for example, measurement data at a plurality of PMU measurement points installed at a part of nodes of the power system in FIG. 2 are stored in the PMU observation value database DB2 via the communication network 350, and state quantity error data D5 or a stability error detection index DI obtained by further indexing the state quantity error data D5 is detected as information affecting the stability, based upon stored PMU measurement data D2 and information D3 of the fault condition database DB3 in which the voltage change, and the like of the node according to the condition of the assumed fault of each place and aspect already calculated by the preliminary calculation, and the like are stored.

In the error detection alert generation unit 13, in a case where the stability error detection index DI with respect to the PMU observation value D2 calculated by the stability error detection index calculation unit 11 is equal to or greater than a threshold value, this case is detected as an abnormality and an alert is generated.

In the threshold value determination unit 14, a threshold value D6 relating to the stability error detection index is set from the outside. The threshold value determination unit 14 sets the threshold value so that a probability of not determining a stable sides as an unstable side becomes a certain fixed value.

FIG. 3 is a diagram illustrating a hardware configuration example of the power flow monitoring device for the power system 10 to which an embodiment of the present invention is applied. The power flow monitoring device for the power system 10 is formed of a calculation system, and a display unit 21 such as a display device, and the like, an input unit 22 such as a keyboard, a mouse, and the like, a communication unit 23, a CPU 24, a memory 25, and various databases DB are connected to a bus line 26. The power system information database DB1, the PMU observation value database DB2, and the fault condition database DB3 are provided as a database of the power flow monitoring device for the power system 10.

For example, the display unit 21 may be configured to use a printer device or a voice output device, and the like instead of the display device or in addition to the display device. For example, the input unit 22 can be configured to be provided with at least one of a pointing device such as a keyboard switch, a mouse, and the like, a touch panel, a voice instruction device, and the like.

The communication unit 23 is provided with a circuit and a communication protocol for being connected to the communication network 350.

The CPU 24 executes a calculation program, thereby performing an instruction of image data to be displayed, and a search of data in various databases. The CPU 24 may be configured as one or a plurality of semiconductor chips, or may be configured as a computer device such as a calculation server.

For example, the memory 25 is configured as a RAM (Random Access Memory) and stores a computer program or stores calculation result data, image data, and the like that are required for each process. Screen data stored in the memory 25 are sent to the display unit 21, and then are displayed thereon.

FIG. 4 is a flowchart illustrating an overall process example of the power flow monitoring device for the power system 10. In first process step S1, the state of the power system is estimated based upon the information D1 of the power system information database DB1 in which the measurement data at the plurality of measurement points are stored.

FIG. 5 is a process flowchart illustrating an example of state estimation calculation to be executed in first process step S1 in FIG. 4. In process step S11, a state value X is determined so that a relational equation of an equation (2) becomes minimum from a relationship between an observation value Z, a power system state value F(X), and a power system error e expressed by an equation (1). Here, Z is an observation value of effective power P, reactive power Q, voltage V, and the like; X is a power system state (voltage V, voltage phase θ, and the like); and F(X) is a value of a state quantity (determined by a circuit equation determined from a connection state of a circuit and impedance thereof).

[Equation 1]

$$Z=F(X)+e \quad (1)$$

[Equation 2]

$$\{Z-F(X)\}^2 \rightarrow \min \quad (2)$$

In process step S12 in FIG. 5, a residual ε is calculated and the removal of error data is performed, such that a measurement value having a large residual is removed, or the measurement value is replaced with an alternative pseudo measurement value (use past measurement value data instead).

In process step S13, the calculated residual ε is compared with a specified value. When the residual ε is equal to or less than the specified value, a process flow of the state estimation calculation is terminated, and when the residual ε is equal to or greater than the specified value, the process flow thereof returns to step S11. Further, such state estimation calculation of the power system is an established calculation method and can be calculated by using a general algorithm. The state value X which is determined that the residual ε is equal to or less than the specified value is outputted and stored as the state estimation result data (state quantity estimation value) D4.

Referring back to FIG. 4, in the next process step S2, the stability error detection index DI is calculated for each fault point and each generator based upon the state estimation result data (state quantity estimation value) D4, the PMU data D2, and the fault point data D3.

The stability error detection index DI is an index representing a degree to which the state estimation affects the stability of the power system. The stability error detection index DI is obtained by indexing the state quantity error data D5 affecting the stability.

For example, in the power system illustrated in FIG. 2, it is assumed that a fault occurs (assumed fault 160) in the power transmission line 140 between the node 3 and the node 6. In this case, the state estimation of the power system at the nodes 6 and 2 where the phase measurement device PMU is installed can be accurately performed, whereas it is considered that as the node where only other existing measurement instruments are installed, for example, the state estimation of the power system at the node 3 deteriorates in accuracy. In this case, considering that the state estimation of the node 3 is performed with higher accuracy, in the present invention, for example, when a difference between the state quantity estimation value D4 of the node 3 close to the fault point 160 and the value of the PMU data D2 of the node 6 close to the fault point 160 is large, it is assumed that discrimination accuracy of transient stability deteriorates, and the stability error detection index DI is set to become large. Conversely, when the difference between the state quantity estimation value D4 of the node 3 close to the fault point 160 and the value of the PMU data D2 of the node 6 close to the fault point 160 is small, it is assumed that the discrimination accuracy of the transient stability does not so deteriorate, and the stability error detection index DI is set to become small.

In an example of the present invention which will be hereinafter described, as an example of the state quantity estimation value D4 of the node 3 close to the fault point 160 and the value of the PMU data D2 of the node 6 close to the fault point 160, a case in which the stability error detection index DI is obtained when the state quantity is an internal phase difference angle δ of the generator will be described.

Further, here, the state quantity estimation value D4 and the value of the PMU data D2 may use any one of the power flows of the power system (effective power P, reactive power Q, voltage V, voltage phase δ, and the like) calculated by the state estimation or may use a plurality of parameters. Further, the parameter used from among the power flows of the power system (effective power P, reactive power Q, voltage V, voltage phase θ, and the like) may be a value of only one-time cross section or may be an average value of a plurality of time cross sections, and the like. Further, only the state estimation result D4 and the PMU data D2 of a generator installation node may be used, or the state estimation result D4 and the PMU data D2 of all the PMU installation nodes may be used. Additionally, as the effective power P and the voltage phase δ of the PMU data of the generator installation node are large, a fact that a margin until the out-of-step is small may be included in the equation. The index representing whether to close to the fault point may be a magnitude of equivalent impedance viewed from the fault point, or may be a voltage of the node and a change amount of the power flow according to the fault held in advance in the database by the preliminary calculation.

An example of the stability error detection index DI is represented in an equation (3).

[Equation 3]

$$DI(\text{Fault\_point}, \text{Genarator\_No.})=(\delta_{SE}-\delta_{PMU})*S \quad (3)$$

As the estimation result of the state quantity of the generator installation node (in this case, internal phase difference angle), the equation (3) is an equation that multiplies a difference between an internal phase difference angle $\delta_{SE}$ obtained from the existing detector data at the node 3 in FIG. 2 and an internal phase difference angle $\delta_{PMU}$ obtained from the PMU data at the node 6 by a sensitivity S of the stability error detection index representing whether to close to the fault point 160 (sensitivity of the fault point and the observation node), and DI represents the stability error detection index indicating the easiness of the out-of-step of the generator for each fault point.

Further, the internal phase difference angles $\delta_{SE}$ and $\delta_{PMU}$ are data that are calculated and measured most recently, and the sensitivity S is data held in advance by the preliminary calculation, and the like of the stability calculation for a fixed period.

The stability error detection index DI represented in the equation (3) uses data such as an error between the PMU observation value D2 installed at the generator connection node and the state estimation result D4, and the like, and determines whether or not the state estimation error gives a good influence on the stability or a bad influence thereon.

On the assumption that a sign of an internal phase difference angle before the fault ($\delta_{SE}-\delta_{PMU}$) and an internal phase difference angle after the fault ($\delta_{SE}-\delta_{PMU}$) does not change, when the stability error detection index DI is positively in a large direction, there exists a case in which a stable side is determined to be an unstable side, thereby causing an increase in cost due to measures such as excessive power supply control, and the like. When the stability error detection index DI is negatively in a large direction, there exist a case in which the unstable side is determined to be the stable side, thereby causing power failure due to measures such as excessively small power supply control, and the like.

FIG. 6 illustrates a voltage change of a node according to a fault (assumed fault) held in advance in the database by the preliminary calculation of the stability calculation as an example of the sensitivity S in the equation (3). Here, the voltage is taken and indicated on the vertical axis for each node number on the horizontal axis, and an example of a simulation result of the voltage at the time of the fault of each node in the stability analysis is represented. Since it is assumed that the assumed fault in FIG. 2 occurs in the power transmission line 140 between the node 3 and the node 6, the voltage change of the closest node 6 is the largest, and is large in order of the node 3 and the node 2.

Generally, as a distance is farther, a degree of voltage drop at the time of the fault tends to be smaller. When the voltage drop is in a large relationship, a degree of influence (weight) given on the setting of the sensitivity S in the equation (3) is set to be large. For example, FIG. 7 illustrates a situation when it is assumed that the assumed fault 160 occurs at the position illustrated in FIG. 2 in the power system having the configuration illustrated in FIG. 2. When viewing the node 2 and the node 6 where the PMU is installed in the plurality of nodes in the power system, it can be seen that the weight of the PMU installation node 6 close to the assumed fault point 160 is large, and the weight of the PMU installation node 2 far from the assumed fault point 160 is small. The weight which is the index representing the proximity from the fault point ay also be determined from a ration of voltage drop of each node at the time of the assumed fault condition.

Referring back to FIG. 4, in process step S3, when the stability error detection index DI is smaller than a predetermined threshold value, the process flow of the power flow monitoring device for the power system is terminated, and when the stability error detection index DI is greater than the predetermined threshold value, the process proceeds to process step S4. In process step S4, a warning alert is generated. In a threshold value determination method, for example, all the power flow cases are created by using Monte Carlo simulation and past data in consideration of errors of the measurement data, and it is desirable to set the probability of not determining the stable side as the unstable side to become 99.9% by comparing the stability error detection index DI with the stability of each power flow case.

According to the first embodiment, in a case where the state does not converge or in a case where the accuracy is low, the aforementioned case can be detected as the abnormality, thereby having an effect of generating the alert by detecting the state quantity error affecting the stability. When the alert is generated, there is an effect of preventing the increase in cost due to the measures such as the excessive power supply control, and the like, and the power failure due to the measures such as the excessively small power supply control, and the like by taking appropriate measures such as the power supply control, and the like.

Second Embodiment

A second embodiment of the present invention will be hereinafter described. Further, the description overlapping with the content described in the first embodiment will be omitted.

FIG. 8 illustrates a software configuration example of a power flow monitoring device for a power system according to the second embodiment. The power flow monitoring device for the power system of the second embodiment illustrated in FIG. 8 is formed by adding a stability error detection index selection unit 14 to the configuration of the first embodiment. In the stability error detection index selection unit 14, when the stability error detection index calculation unit 12 calculates a plurality of stability error detection indexes, a stability error detection index having a greater value is selected from among the stability error detection indexes.

FIG. 9 is a flowchart illustrating an overall process example of the power flow monitoring device for the power system according to the second embodiment, and illustrates an example in which process step S5 of selecting the stability error detection index is added to the flowchart in FIG. 4. In this process step S7 which is a difference from the first embodiment, the largest stability error detection index DI is selected from among the plurality of stability error detection indexes DI calculated by the stability error detection index calculation unit 12. For example, the stability error detection index other than the above-mentioned stability error detection index DI (internal phase difference angle $\delta$) is a preferably a power flow flowing through the generator by direct monitoring of the power flow.

In a case where the state estimation result does not converge or in a case where the PMU cannot be observed, even though the above-mentioned stability error detection index DI calculates a wrong value, the aforementioned case can be detected as an abnormality by the stability error detection index. However, since the unit of the stability error detection index is different, the stability error detection index DI in which the power flow due to an error is generated at a probability of 99.9% may be standardized by being set to 1.0 with reference to the probability that the stable side is not determined as the unstable side.

According to the second embodiment, even in a case where one stability error detection index calculates the wrong value, this case can be detected as the abnormality by another stability error detection index by using the plurality of stability error detection indexes DI and selecting the stability error detection index on the more stable side, thereby having an effect of generating the alert. At the time of generating the alert, the appropriate measures such as the power supply control, and the like are taken, thereby having an effect of preventing the power failure due to the measures such as the excessively small power supply control, and the like.

Third Embodiment

A third embodiment of the present invention will be hereinafter described. Further, the description overlapping with the content described in the first embodiment will be omitted.

FIG. 10 is a diagram illustrating a software configuration example of a power flow monitoring device for a power system according to the third embodiment. The power flow monitoring device for the power system of the third embodiment illustrated in FIG. 10 is a power flow monitoring device for a power system in which a PMU missing data complementing unit 16 is added to the first embodiment.

In the PMU missing data complementing unit 16, when PMU observation data are not obtained for a certain fixed time or longer, or when the alert is generated or the PMU data are not obtained for less than the certain fixed time, the time series holds a previous value (any average value of several points can be used) or uses a value that predicts a change amount, thereby being regarded as a true value.

According to the third embodiment, when the PMU observation value is regarded as not being the true value by verifying the validity of the PMU observation value, an abnormal state can be appropriately detected by being substituted with a value close to the true value, thereby having an effect of generating the alert. When the alert is generated, the appropriate measures such as the power supply control, and the like are taken, thereby having an effect of preventing the increase in cost due to the measures such as the excessive power supply control, and the like, and the power failure due to the measures such as the excessively small power supply control, and the like.

Fourth Embodiment

A fourth embodiment of the present invention will be hereinafter described. Further, the description overlapping with the content described in the first embodiment will be omitted.

FIG. 16 is a diagram illustrating a concept of power system control, protection, and monitoring which is a background of the fourth embodiment. FIG. 16 illustrates a control protection system of a circuit breaker CB installed between the power transmission line 140 and a node 110 in the power system.

Here, power transmission lines 140A, 140B, and 140C are connected in series via nodes 110A, 110B, and 110C, and the circuit breaker CB is respectively installed between the power transmission line 140 and the node 110. In each circuit breaker CB, generally, an opening operation of the circuit breaker CB is determined by a protection relay device RY which inputs a self-terminal current and a self-terminal voltage.

The protection relay device RY is formed based upon a plurality of viewpoints, and for example, a power transmission line protection relay device is formed due to a fault generated in the power transmission line 140, and protection relay devices RYA1 and RYA2 operate in response to a fault generated in the power transmission line 140A, thereby operating so as to open circuit breakers CBA1 and CBA2. Further, a bus protection relay device is formed due to a fault generated at the node 110, and the protection relays RYA2 and RYB1 operate in response to a fault generated in the bus 110B, thereby operating so as to open the circuit breaker CBA2 and a circuit breaker CBB1. Alternatively, a back-up protection relay device is formed, and when receiving a protection fault with respect to a remote fault, an adjacent protection relay device operates in response thereto, thereby operating so as to open the circuit breaker. For example, in the back-up protection, circuit breakers CBC1 and CBC2 are opened with respect to a fault whose fault section is the power transmission line 140C, thereby operating so as to remove the fault, however when failing to remove the fault (reclosing failure), a protection relay device RYB2, which is responsible for protecting a section of the adjacent power transmission line 140B, responds thereto with an appropriate time delay, thereby releasing and controlling a circuit breaker CBB2. The protection by the protection relay devices RY is configured so as to remove a fault generated in a predetermined protection target section.

Meanwhile, from a viewpoint of securing the stability of the power system, power system stabilization devices 18A and 18B perform the opening of the circuit breaker CB. The power system stabilization devices 18A and 18B set a part or the whole of the power system as a target to be monitored, and previously calculate the system stability when the assumed fault is generated in the monitoring area. Further, when the assumed fault is actually generated, in a case where it is assumed that the system stability cannot be secured only by opening and controlling the target section by the protection relay device RY, the opening or input of the circuit breaker CB connected to a generator or a load is planned in advance so as to prepare a power generation amount and a load amount necessary for balancing the necessary power generation amount and the load amount from a viewpoint of power supply and demand, thereby performing circuit breaker control according to the plan at the time of the occurrence of a situation.

The power flow monitoring device for the power system 10 according to the present invention provides a highly reliable state estimation value when the power system stabilization devices 18A and 18B perform the preliminary calculation of the circuit breaker which is scheduled to be opened from a viewpoint of securing the supply and demand balance of the power system with respect to the assumed fault.

The power system stabilization device 10 of the fourth embodiment illustrated in FIG. 11 adds a power supply control table switching unit 17 to the power system monitoring device 10 of the first embodiment, and is a power flow monitoring device for a power system that provides a control command to the power system stabilization device 18A and the power system stabilization device 18B.

According to FIG. 11, in the power supply control table switching unit 17, in a case where the state estimation error with respect to the PMU observation value calculated by the stability error detection index calculation unit 11 is equal to or greater than the threshold value, the case is detected as the abnormality and is switched from the power system stabilization device 18A at normal time to the power system stabilization device 18B that takes measures such as the power supply control, and the like on the safety side.

The power system stabilization device 18A is assumed to be, for example, an on-line power system stabilization device. The on-line power system stabilization device is a power system stabilization device that performs the stability calculation by inputting power system information collected online at a fixed period, and determines optimum power supply control at that point.

The power system stabilization device 18B is assumed to be, for example, an off-line power system stabilization device. The off-line power system stabilization device is a power system stabilization device that determines the optimum power supply control based upon the magnitude of the power flow of the measurement data without using the result of state estimation of the power system.

FIG. 12 illustrates an example of a flowchart representing a process of a power system stabilization monitoring device in which process step S4 for generating the alert is excluded from the flowchart illustrating the overall process of the power flow monitoring device for the power system in FIG. 4, and process step S6 using the power system stabilization device 18A and process step S7 using the power system stabilization device 18B are added.

In process step S6 which is a difference from the first embodiment, when the stability error detection index DI is smaller than the predetermined threshold value, the power system stabilization device A at normal time is used in process step S4. In process step S7 which is a difference from the first embodiment, when the stability error detection index DI is greater than the predetermined threshold value, the process is switched to the power system stabilization device 18B that takes measures such as the power supply control, and the like on the safety side in process step S5. Further, as described in the first embodiment, when the stability error detection index DI is greater than the predetermined threshold value, the process is not only switched to the power system stabilization device 18B, but also may generate a warning alert at the same time.

According to the fourth embodiment, appropriate electric control can be performed by switching the power supply control table with the stability error detection index DI having an influence on the error of stability, thereby having an effect of preventing the power failure. The effect thereof will be described with reference to FIGS. 13, 14, and 15.

FIG. 13 illustrates a case in which the state estimation is desirable when using the power system stabilization device 18A at normal time. An upper part of FIG. 13 illustrates a time relationship from the time before fault occurrence (time 0 ms) to the time after fault removal through the fault occurrence (time 100 ms) and the fault removal (170 ms).

The state of the power system at each time is illustrated in the second stage of FIG. 13. The power system which is a target is formed of two power lines between a plurality of nodes, and in a state before the fault occurrence (time 0 ms), since the error between the existing measurement instrument SE and the PMU is small, the power system stabilization device 18A at normal time is used. In a state of the fault occurrence (time is 100 ms), the fault 140 is generated in the vicinity of a node where the error between the existing measurement instrument SE and the PMU is small. In a state of the fault removal (170 ms), the removal of the power transmission line where the fault occurs is performed, and only the relevant section is set as one power transmission line.

On the left side of the third stage of FIG. 13, the internal phase difference angle δ representing estimated system stability at the time of the assumed fault is shown in time series and the system is stabilized by the fault removal. On the right side of the second stage of FIG. 13, as a result, it is shown that the electric control (additional control of the shut-off and input of a generator and a load) is not performed after the fault removal. Further, On the right side of the third stage of FIG. 13, a relationship between an estimated power flow amount by the existing measurement instrument SE, an estimated power flow amount (true value) by the PMU and, for example, the number of generators to be electrically controlled is shown, and a relationship in which an error between the estimated power flow amount by the existing measurement instrument SE and the estimated power flow amount (true value) by the PMU when using the power system stabilization device A at normal time is small and the estimated power flow amount is less than one control amount is shown.

Accordingly, in the case of FIG. 13, since the fault occurs in the vicinity of the node where the error between the state estimation result and the PMU observation value is small, a power flow state can be estimated with high accuracy and the power system is stabilized by selecting the number of generators that appropriately control electricity.

FIG. 14 illustrates a case in which the state estimation error cannot be detected when using the power system stabilization device 18A at normal time.

An upper part of FIG. 14 illustrates a time relation from the time before fault occurrence (time 0 ms) to the time after fault removal through the fault occurrence (time 100 ms) and the fault removal (170 ms).

The state of the power system at each time is illustrated in the second stage of FIG. 14. The power system which is a target is formed of two power lines between a plurality of nodes, and in a state before the fault occurrence (time 0 ms), since the error between the existing measurement instrument SE and the PMU is large, the use of the power system stabilization device 18A at normal time may cause a problem. In a state of the fault occurrence (time is 100 ms), the fault 140 is generated in the vicinity of a node where the error between the existing measurement instrument SE and the PMU is large. In a state of the fault removal (170 ms), the removal of the power transmission line where the fault occurs is performed, and only the relevant section is set as one power transmission line.

On the left side of the third stage of FIG. 14, the internal phase difference angle δ representing estimated system stability at the time of the assumed fault is shown in time series and the system is not stabilized (diverged) by the fault removal, meanwhile, when using the power system stabilization device 18A at normal time which does not recognize that the error between the existing measurement instrument SE and the PMU is large, as a result, it is assumed that the electric control cannot be performed. On the right side of the third stage of FIG. 14, a relationship between an estimated power flow amount by the existing measurement instrument SE, an estimated power flow amount (true value) by the PMU, and, for example, the number of generators to be electrically controlled is shown, and even though an error between the estimated power flow amount by the existing measurement instrument SE and the estimated power flow amount (true value) by the PMU when using the power system stabilization device 18A at normal time is large and the estimated power flow amount (true value) by the PMU is more than one control amount, a relationship in which the estimated power flow amount by the existing measurement instrument SE is estimated to be less than one control amount is shown. On the right side of the second stage of FIG. 14, as a result, it is shown that the electric control (additional control of the shut-off and input of the generator and the load) is not performed after the fault removal.

Accordingly, in the case of FIG. 14, since the fault occurs in the vicinity of the node where the error between the state estimation result and the PMU observation value is large, the power flow state cannot be estimated with high accuracy and the number of generators that appropriately control electricity cannot be selected, thereby causing the instability of the power system. In FIG. 14, since the fault occurs in the vicinity of the node where the error between the state estimation result and the PMU observation value is large, the power flow state cannot be estimated with high accuracy and the number of generators that appropriately control electricity cannot be selected, thereby causing the instability of the power system.

FIG. 15 is a diagram illustrating a case in which the state estimation error is detected and falls on the safety side when using the power system stabilization device 18B that takes measures such as the power supply control, and the like on the safety side. The phenomenon of the power system up to the fault removal assumed here is the same as that of FIG. 14.

What is different from FIG. 14 is that as illustrated in FIG. 11, a fact that the error between the state estimation result and the PMU observation value is large is reflected, and the process is switched to the power system stabilization device 18B that determines the optimum power supply control based upon the magnitude of the power flow of the measurement data without using the result of the state estimation of the power system.

What is described above is reflected in the diagram of the right side of the third stage of FIG. 15. In the diagram on the right side of the third stage of FIG. 15, with respect to a relationship between an estimated power flow amount by the existing measurement instrument SE, an estimated power flow amount (true value) by the PMU, and, for example, the number of generators to be electrically controlled, even though an error between the estimated power flow amount by the existing measurement instrument SE and the estimated power flow amount (true value) by the PMU when using the power system stabilization device 18B is large and the estimated power flow amount (true value) by the PMU is equal to or more than one control amount indicated by a solid line, a relationship in which the estimated power flow amount by the existing measurement instrument SE is estimated to be less than one control amount indicated by a dotted line is shown.

Meanwhile, as a result of adopting the power system stabilization device 18B and reflecting the fact that the error between the state estimation result and the PMU observation value is large, in this case, a reference value of the number is more shifted to the safety side. Specifically, the number of lines is reduced as indicated by the dotted line. Accordingly, even the estimated power flow value including the error exceeds one line of the dotted line, and the electric control (additional control of the shut-off and input of the generator and the load) is performed after the fault removal. In the electric control, one generator in the vicinity of the fault point is shut off from the power system.

As descried above, according to FIG. 15, since the fault occurs in the vicinity of the node where the error between the state estimation result and the PMU observation value is large, the power flow state cannot be accurately estimated, however, the power system is stabilized by selecting the number of generators to be electrically controlled on the safety side (increasing direction).

REFERENCE SIGNS LIST

10: power flow monitoring device for power system
11: state estimation calculation unit
12: stability error detection index calculation unit
13: error detection alert generation unit
14: threshold value determination unit
15: stability error detection index selection unit
16: PMU missing data complementing unit
17: power supply control table switching unit
18A: Power system stabilization device
18B: Power system stabilization device
21: display unit
22: input unit
23: communication unit
24: CPU
25: memory
26: bus line
110: node
120: transformer
130: generator
140: power transmission line
150: load
300: communication network
DB1: power system information database
DB2: PMU observation value database
DB3: fault condition database

The invention claimed is:

1. A power flow monitoring device for a power system, comprising:
a power system information database configured to store measurement data obtained at a first node of a power system;
a phase measurement value database configured to store temporally synchronized phase measurement data obtained at a second node of the power system;
a fault condition database configured to store a power flow state under an assumed fault condition of the power system;
a central processing (CPU);
a memory in communication with the CPU, the memory storing a plurality of instructions executable by the CPU to cause the implementation of:
a state estimation calculation unit that estimates a state quantity of the power system using information in the power system information database as an input;
a stability error detection index calculation unit that calculates a stability error detection index using, as an input, a state quantity estimation value which is an output of the state estimation calculation unit, information of a state quantity from the phase measurement value database, and information in the fault condition database; and
an error detection alert generation unit that compares the stability error detection index with a threshold value thereof and to generate an alert when the stability error detection index exceeds the threshold value, wherein
the stability error detection index calculation unit that multiplies a difference between the state quantity estimation value and the information of the state quantity from the phase measurement value database by a weight which is an index representing proximity from a fault point, thereby obtaining the stability error detection index, and
a magnitude of a deviation between the state quantity estimation value and the state quantity from the phase measurement data is evaluated according to the assumed fault condition before the alert is generated; and
a plurality of power system stabilization devices that calculate power system stability under the assumed fault condition of a power system and gives an opening command to a predetermined circuit breaker of the power system when the alert is generated.

2. The power flow monitoring device for the power system according to claim 1, wherein
a voltage and power flow change of a node according to an assumed fault are stored in advance by preliminary calculation of stability calculation in the fault condition database, and
a weight of a node close to an assumed fault point is set to be large and a weight of a node far from the assumed fault point is set to be small when calculating the stability error detection index.

3. The power flow monitoring device for the power system according to claim 1, wherein
the stability error detection index calculation unit calculates a plurality of stability error detection indexes for each of the state quantities of different types, and
the stability error detection index having a greater value is selected from among the plurality of stability error detection indexes in a stability error detection index selection unit, whereby
the alert is generated from the stability error detection index to mitigate risks of electrical system incidents.

4. The power flow monitoring device for the power system according to claim 1, further comprising instructions executable by the CPU to cause the implementation of:
a missing data complementing unit that stores the phase measurement data which is regarded as a true value in such a manner that a time series holds an average value of previous values or a value which predicts a change amount is used with respect to the phase measurement data when the phase measurement data are not obtained for a certain fixed time or longer, or when the alert is generated or the phase measurement data are not obtained for less than the certain fixed time, wherein when the phase measurement data cannot be obtained, an abnormal state is appropriately detected and the alert is generated.

5. The power flow monitoring device for the power system according to claim 1, wherein
the state quantity of the power system is any one of effective power, reactive power, a voltage, and a voltage phase or a combination thereof as a power flow of the power system.

6. The power flow monitoring device for the power system according to claim 1, wherein
a weight which is an index representing a proximity from a fault point is determined from a ratio of voltage drop of each node at the time of the assumed fault condition.

7. A power flow monitoring device for a power system, comprising:
a power system information database configured to store measurement data obtained at a first node of a power system; a phase measurement value database configured to store temporally synchronized phase measurement data obtained at a second node of the power system;
a fault condition database configured to store a power flow state under an assumed fault condition of the power system;
a central processing unit (CPU);
a memory in communication with the CPU, the memory storing a plurality of instructions executable by the CPU to cause the implementation of:
a state estimation calculation unit that estimates a state quantity of the power system using information in the power system information database as an input;
a stability error detection index calculation unit that calculate a stability error detection index using, as an input, a state quantity estimation value which is an output of the state estimation calculation unit, information of a state quantity from the phase measurement value database, and information in the fault condition database; and
an error detection alert generation unit that compares the stability error detection index with a threshold value thereof and to generate an alert when the stability error detection index exceeds the threshold value;
a threshold value determination unit that determines a threshold value of the stability error detection index, wherein
the threshold value determination unit creates a plurality of power flow cases in consideration of an error of the measurement data obtained at the first node of the power system, compares the stability error detection index with stability of each power flow case, and sets the threshold value so that a probability of not determining a stable side as an unstable side becomes a certain fixed value, and
a magnitude of a deviation between the state quantity estimation value and the state quantity from the phase measurement data is evaluated according to the assumed fault condition before the alert is generated; and
a plurality of power system stabilization devices that calculate power system stability under the assumed fault condition of a power and gives an opening command to a predetermined circuit breaker of the power system when the alert is generated.

8. A power system, comprising:
the power flow monitoring device of claim 1, wherein
the plurality of power system stabilization devices comprises:
a power system stabilization device at normal time;
a power system stabilization device configured to perform power supply control to mitigate risks of electrical system incidents; and wherein the power flow monitoring device of claim 1 further comprises instructions executable by the CPU to cause the implementation of:
a power supply control table switching unit that performs opening control of the circuit breaker of the power system by the plurality of power system stabilization devices configured to perform the power supply control to mitigate risks of electrical system incidents when the error detection alert generation unit compares the stability error detection index with a threshold value thereof and detects that the stability error detection index exceeds the threshold value thereof, and to be switched so as to perform the opening control of the circuit breaker of the power system by the power system stabilization device at normal time when the stability error detection index does not exceed the threshold value, wherein
electric control is performed by switching a power supply control table with the stability error detection index having an influence on a parameter measured in relation to a predefined threshold value, thereby preventing power failure.

9. A power flow monitoring method for a power system, comprising:

using measurement data obtained from a measurement instrument installed at a first node of the power system, temporally synchronized phase measurement data obtained from a phasor measurement unit (PMU) installed at a second node of the power system, and power flow state data for estimating a power flow state of the power system at the first node or thea second node when an assumed fault occurs in the power system;

obtaining an estimation value with respect to a state quantity representing stability of the power system from the measurement data and setting a state quantity representing the stability of the power system in the phase measurement data obtained from the PMU as a true value; and obtaining a stability error detection index according to a difference between the true value and the estimation value and the power flow state data and generating an alert when the stability error detection index exceeds a threshold value thereof;

multiplying a difference between the estimation value and a state quantity representing the stability of the power system in the phase measurement data by a weight which is an index representing proximity from a fault point, thereby obtaining the stability error detection index; and evaluating a magnitude of a deviation between the estimation value and the state quantity representing the stability of the power system in the phase measurement data according to the assumed fault condition before the alert is generated;

calculating power system stability under the assumed fault condition of a power system and transmitting an opening command to a predetermined circuit breaker of the power system when the alert is generated.

10. The power flow monitoring method for the power system according to claim 9, wherein the state quantity is a state of a power flow of the power system and the power flow state data is a ratio of a voltage at each node when the assumed fault occurs.

\* \* \* \* \*